G. H. SCOTT.
MACHINE FOR CUTTING METAL RODS.
APPLICATION FILED FEB. 11, 1908.
936,572.
Patented Oct. 12, 1909.
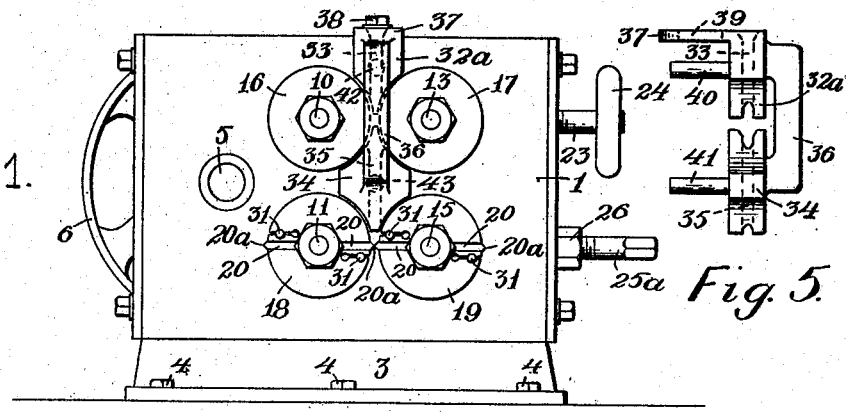
Fig. 1.
Fig. 5.
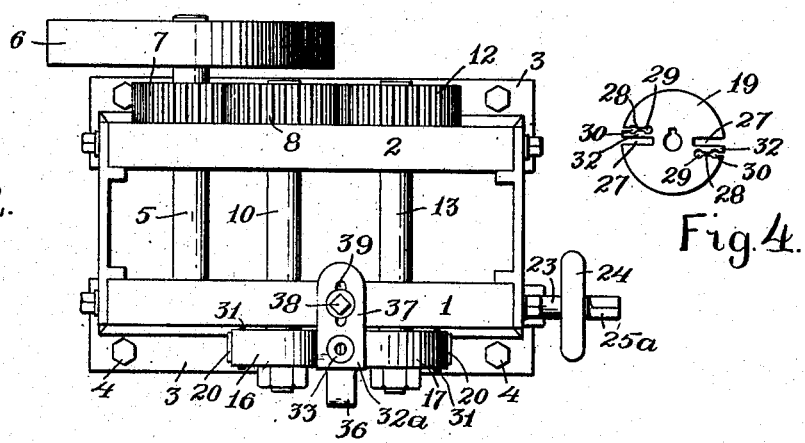
Fig. 2.
Fig. 4.
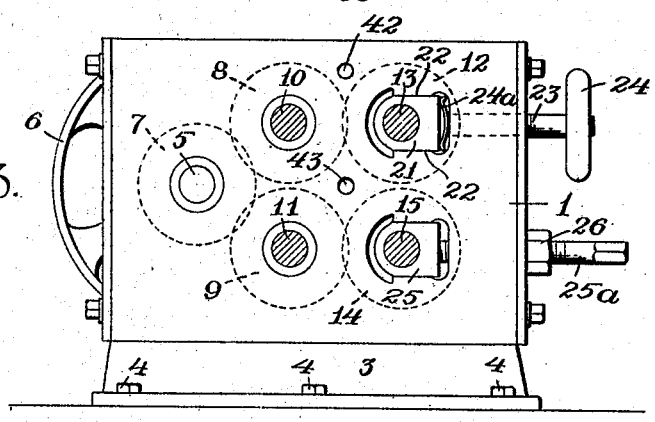
Fig. 3.
Witnesses
B. D. Tolman.
Penelope Cruikerbach.
Inventor
George H. Scott.
By Rufus B. Fowler
Attorney

UNITED STATES PATENT OFFICE.

GEORGE H. SCOTT, OF WORCESTER, MASSACHUSETTS, ASSIGNOR OF ONE-HALF TO MORGAN SPRING COMPANY, OF WORCESTER, MASSACHUSETTS, A CORPORATION OF MASSACHUSETTS.

MACHINE FOR CUTTING METAL RODS.

936,572.  Specification of Letters Patent.  Patented Oct. 12, 1909.

Application filed February 11, 1908. Serial No. 415,302.

*To all whom it may concern:*

Be it known that I, GEORGE H. SCOTT, a citizen of the United States, residing at Worcester, in the county of Worcester and Commonwealth of Massachusetts, have invented a new and useful Improvement in Machines for Cutting Metal Rods, of which the following is a specification, accompanied by drawings forming a part of the same, in which—

Figure 1 is a front elevation. Fig. 2 is a plan view. Fig. 3 is a front elevation with the feed rolls and cutting disks removed. Fig. 4 is a detached front view of one of the disks for carrying the cutting knives, and Fig. 5 is a detached side view of the adjustable rod guide.

Similar reference letters and figures refer to similar parts in the different views.

My invention relates to a machine for cutting metal rods, and comprises means by which wire and rods of more or less serpentine and irregular form, and hence difficult to handle, may be cut into convenient lengths to handle as scrap metal, and it consists in the construction and arrangement of parts as hereinafter described and pointed out in the annexed claims.

Referring to the accompanying drawings 1 and 2 denote front and back plates forming a portion of the frame of the machine, mounted upon a base 3 attached to a stand, not shown, by bolts 4. Journaled in the plates 1 and 2 is a driving shaft 5 which is rotated by a belt pulley 6. The shaft 5 carries a gear 7 which is in engagement with gears 8 and 9 carried on shafts 10 and 11. The gear 8 is in engagement with the gear 12 mounted on a shaft 13, and the gear 9 engages a gear 14 upon the shaft 15. The shafts 10 and 13 are journaled in the plates 1 and 2, and carry feed rolls 16 and 17, and the shafts 11 and 15 carry the disks 18 and 19, in which are mounted cutting blades 20. Adjustability of the feed rolls 16 and 17 toward or away from each other is provided by mounting the front end of the shaft 13 in a block 21, adjustable in ways 22 in the front plate 1, by means of a screw 23 provided with a hand wheel 24. Inequalities in the material passing between the feed rolls 16 and 17 are compensated by a spring 24ᵃ interposed between the block 21 and screw 23. Adjustability of the disk 19 is provided for by a similar block 25, against which a screw 25ᵃ bears, enabling the cutting edges of coöperating knives to be brought closely together as the disks rotate, and a check nut 26 is provided to hold the block 25 rigidly in position.

The cutting disks 18 and 19 are constructed as follows:—Radial slots 27 are provided to receive the cutting blades 20 which have their outer ends beveled to form cutting edges 20ᵃ, arranged to sever the rod between them upon the revolution of the disks, as shown in Fig. 1. Parallel with the slots 27 I construct slots 28 terminating at their inner ends in holes 29 and having enlarged openings 30 near their outer ends to receive tapering pins 31, Fig. 1, in order to crowd the tongues 32 against the blades 20 and securely hold them in the slots 27. A guide 32ᵃ consisting of a plate provided with a vertical passage 33 conducts the rods to the feed rolls 16 and 17, and a similar guide 34, having a vertical passage 35, conducts the rods between the feed rolls and the cutting blades. The guides 32ᵃ and 34 are connected by a yoke 36, and hang suspended from an adjustable arm 37, resting upon the top of the frame and secured in position by a bolt 38 passing through a slot 39, which allows the guides to be moved out or in, in order to direct the rods to different sections of the cutting edges 20ᵃ as they become dulled. The guides are provided with steady pins 40 and 41 which are capable of sliding in holes 42 and 43 in the frame.

In the operation of my machine wire or rods of more or less irregular form are straightened sufficiently to enter the guide 32ᵃ, and are fed by the feed rolls 16 and 17 through the guide 34 to the cutting disks 18 and 19. The revolution of the cutting disks severs the wire passing through the guide 34 into pieces of convenient length for handling as scrap metal.

I claim:

1. A machine for cutting wire rods, having a pair of feed rolls with their axes in the same horizontal plane, a pair of disks below said feed rolls, with the axes of said disks in the same horizontal plane, said disks having cutting blades, means for rotating said rolls and disks, vertical guides for conducting a rod to said feed rolls and from said feed rolls to said disks, and means for supporting said guides from above said feed rolls.

2. A machine for cutting wire rods, having a pair of feed rolls with their axes in the same horizontal plane, a pair of disks provided with cutting blades, with the axes of said disks in the same horizontal plane, one of said rolls and one of said disks being adjustable laterally, and means for rotating said rolls and disks.

3. In a machine for cutting wire rods, the combination of disks provided with radial slots, cutting blades inserted in said slots, and means for reducing the width of said slots to hold said blades therein.

4. In a machine for cutting wire rods, the combination of feed rolls and disks provided with cutting blades, of a guide for conducting said wire rods to said feed rolls, and from said feed rolls to said disks, means for rotating said rolls and disks, and means for the adjustment of said guides to conduct the rod to different sections of said cutting blades.

5. A machine for cutting wire rods, having a pair of feed rolls and a pair of disks provided with cutting blades, each feed roll and each disk carried on one end of a shaft, with a pinion upon the other end of each shaft in engagement with each other or with a driving pinion, one of said rolls and one of said disks being adjustable laterally, and means for rotating said driving pinion.

6. A machine for cutting wire rods, having a disk provided with a radial slot, a cutting blade inserted in said radial slot, said radial slot provided with a yielding wall, and means for moving said yielding wall toward the opposite wall of said radial slot.

7. A machine for cutting wire rods, having feed rolls and disks provided with cutting blades below said feed rolls, said feed rolls and disks carried on horizontal shafts, means for rotating said rolls and disks, vertical guides for conducting a rod to said feed rolls and from said feed rolls to said guides, and means for adjusting said guides in a line parallel to said horizontal shafts.

Dated this sixth day of February 1908.

GEORGE H. SCOTT.

Witnesses:
PENELOPE COMBERBACH,
RUFUS B. FOWLER.